United States Patent [19]

Routt, Jr. et al.

[11] 4,346,292
[45] Aug. 24, 1982

[54] COAXIAL OPTICAL SCANNER

[75] Inventors: Wilson M. Routt, Jr., Lexington; Donald L. West, Winchester, both of Ky.

[73] Assignee: International Business Machines Corporation, Armonk, N.Y.

[21] Appl. No.: 230,936

[22] Filed: Feb. 2, 1981

[51] Int. Cl.³ .............................................. H01J 3/14
[52] U.S. Cl. .................................... 250/216; 235/462
[58] Field of Search ................. 250/216, 568; 235/462

[56] References Cited

PUBLICATIONS

IBM Technical Disclosure Bulletin, vol. 16, No. 4, Sep. 1973, "Mask to Wafer Alignment System", R. Feder et al., p. 1307.
IBM Technical Disclosure Bulletin, vol. 16, No. 5, Oct. 1973, "Coupler for Optical Data", L. Cooper, pp. 1470-1471.
IBM Technical Disclosure Bulletin, vol. 22, No. 6, Nov. 1979, "Optical Focusing Technique", H. G. Nauth et al., pp. 2515-2516.

Primary Examiner—David C. Nelms
Assistant Examiner—Darwin R. Hostetter
Attorney, Agent, or Firm—John A. Brady

[57] ABSTRACT

A scanner for mechanically distinguishing light from dark areas of an image, having a light source 4, a collecting lens 7 directing light from the source to surface 11 of a total internal reflective block 62 (block 9 in FIG. 1). The top, parallel surface 13 reflects the light through a focusing, hemispherical condenser lens 17. Light reflected from area 21 on document 23 is collected by the center of lens 17, passes through notch 64 (an area of non-surface 15 in block 9 in FIG. 1), and then through an objective lens 27, from which it is focused on phototransistor 29. The scanner functions well without precise positioning of document.

13 Claims, 5 Drawing Figures

COAXIAL OPTICAL SCANNER

TECHNICAL FIELD

This invention relates to scanners for image recognition and the like by which light is trained on small areas and reflected light is observed. A major feature of this invention is in providing a scanner which is relatively insensitive to small variations in the location of the image observed. Another advantage is that in some embodiments the optical system may be molded in one or a few pieces.

BACKGROUND ART

The lenses and the total reflective block employed in the optical system of this invention are conventional and are used for their conventional purpose. Similarly, it is an established technique in optical systems to employ coaxial paths by training light on a target on one optical path and to split the reflections on that same optical path out from that path to a second or more optical paths. Prior art illustrating such path separation appears in the following published articles: *IBM Technical Disclosure Bulletin*, Vol. 16, No. 4, Sept. 1973, entitled "Mask to Wafer Alignment System", by R. Feder et al., at page 1307; and *IBM Technical Disclosure Bulletin*, Vol. 16, No. 5, Oct. 1973, entitled "Coupler for Optical Data", by L. Cooper, at pages 1470–1471; and *IBM Technical Disclosure Bulletin*, Vol. 22, No. 6, Nov. 1979, entitled "Optical Focusing Technique", by H. G. Nauth et al., at pages 2515–2516. No such art is known which includes an optical scanner with two coaxial paths having concentric lens systems.

Moreover, the more specific interrelationships of the design of this invention are not known to be closely similar to any prior art.

DISCLOSURE OF THE INVENTION

The invention in its primary form is a unitary assembly to generate light and direct it to a small area of a document or other marked surface, to receive the reflections with an optical system, including an objective lens, which shares the same optical path as the light focusing path, and to the focus the reflected light on a photosensor. By employing the coaxial design, imprecise positioning of the document may be tolerated.

The invention employs a light source, a collecting lens, a flat, reflective surface, a second reflective surface parallel with the first surface having a central area transmissive to the light when reflected, and a condenser lens. A central region of the condenser lens acts as part of an optical system which collects and focuses the reflected light. The system is designed to direct the illuminating light to a predetermined point near which the document surface is to be positioned. In the preferred embodiment the center of the condenser lens is a continuation of the curvature of the outer region, which center then acts generally as a collimating lens. A focusing or objective lens is in the optical path past the collimating lens. The central lens system thus formed is designed to direct light from the predetermined point through the transmissive area onto a photo-sensitive element located at a second predetermined point.

BRIEF DESCRIPTION OF THE DRAWINGS

The details of this invention will be described in connection with the accompanying drawing, in which.

BEST MODE FOR CARRYING OUT THE INVENTION

First Embodiment

Figure 1:
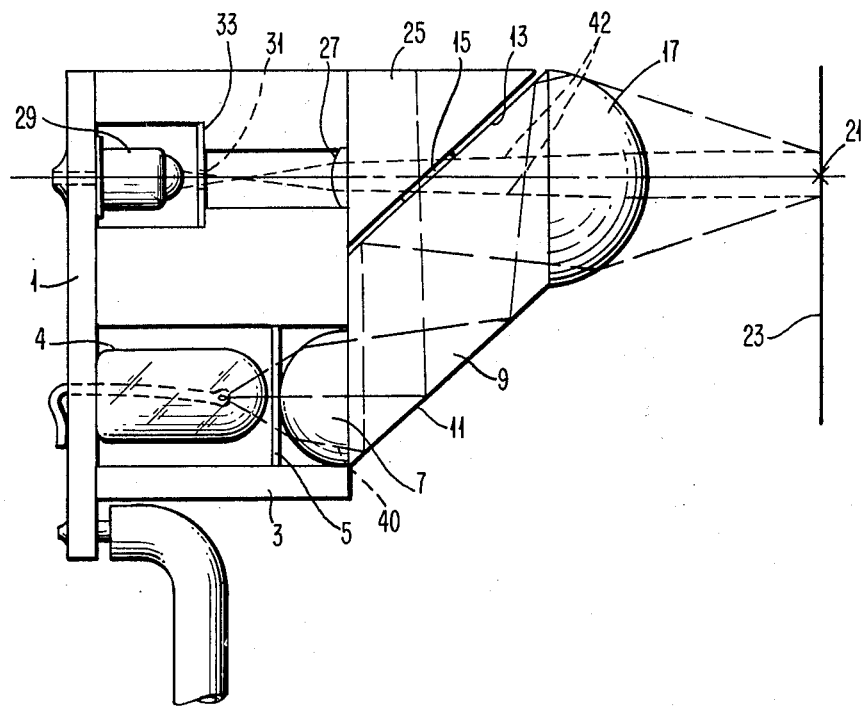
FIG. 1 is a view of a first embodiment of the scanner assembly from the side in a cross section taken generally through the middle of the assembly.

Referring to FIG. 1, the scanner finds overall structural support from a housing, comprised in the first embodiment, shown in FIG. 1, of rear housing wall 1 and bottom wall 3, the exact structure of which may be varied as convenient, so long as the necessary elements of the scanner are firmly positioned. Accordingly, elements of supporting structure are shown somewhat illustratively only in the drawing. An incandescent lamp 4, which may be a standard, commercial article, is mounted to rear wall 1. This generates light from a generally small area at an internal filament or otherwise provides light at a point or limited area. Immediately past lamp 4 a filter 5 to eliminate infrared light may be provided. This is optional, but may be desirable where the marks to be scanned are not absorptive in the infrared region of the spectrum.

Immediately past filter 5 is a hemispherical collecting lens 7. The spherical surface of lens 7 faces light 4 while the flat surface is integral with block 9. Block 9 has a bottom planar surface 11 and a top planar surface 13, top surface 13 having integral with it, however, a smaller block 15, of optically transmissive material. Block 15 is rectangular in cross section, but a more complicated design could be determined for optimal light transmission.

A hemispherical lens 17 has its spherical surface facing outward and its flat surface integral with the end of block 9 opposite lens 7. A central region of hemispherical lens 17 acts generally as a collimating lens in the receiving optical system as will be discussed. Lens 17 focuses light from lamp 3 onto a small area slightly beyond region 21, region 21 being spaced a predetermined amount from the surface of lens 17. This blurs any filament image to give more uniform illumination at region 21. Also, because central light is not included, the focus behind region 21 actually produces higher illumination at region 21. A document 23, carrying marks to be observed through lens 17, is to be mounted with its surface at region 21. Central block 15 is in the optical path from the center area of lens 17 as it transmits light from point 21. This light passes through block 15, through a triangular supporting block 25 and to an objective of focusing lens 27 having a convex surface facing away from region 21, with the opposite surface integral with block 25. Light from point 21 is collimated by the center of lens 17 and focused by lens 27 onto the aperture 31 in an opaque wall 33 immediately preceding phototransistor 29. Light passing through aperture 31 is incident on the active region of phototransistor 29.

THE LIGHT PATHS

Dotted lines are shown in FIG. 1 to illustrate the optical effects achieved inherently by the structure in accordance with the design herein described. Light emitted from lamp 4 before it is reflected by document 23 is illustrated by lines of long dashes, designated 40. Light after reflection by document 23 is illustrated by lines of shorter dashes, designated 42. The lens and block material are acrylic resin having an index of refraction and curvature where appropriate to achieve the focusing and optical paths shown. All curved optical surfaces are spherical for manufacturing economy, although more precisely designed lens surfaces may, of course, be employed.

Thus, the light 40 is collected from the small source of lamp 4 by the surface of collecting lens 7. Lens 7 produces a column of light, in the specific embodiment having a slightly diverging configuration. Surfaces 11 and 13 are optically polished and the angles of incidence of light 40 are large enough to produce total internal reflection. Light 40 is thereby reflected in block 9 from surface 11 to surface 13 in the collimated, slightly expanding beam created by lens 7. At surface 13 most of the light 40 is reflected to condenser lens 17, although that part trained upon small block 15 encounters no such optical surface and simply passes into block 25 and is lost.

The beam of light 40, less the relatively small center part lost through block 15, is directed by the surface of lens 17 onto the region 21. The point of focus is on the line on the center axis of lenses 17 and 27 and the center of block 15. Sufficient magnification is designed into the lens system of lenses 7 and 17 to light a region somewhat larger than the localized source of light from lamp 3. (Where the aperture 31 or the size of block 15 is relatively small, the system could demagnify light from source 3.)

Reflected light 42 is from the surface of document 23 in the region 21. These reflections are collected by the center surface of lens 17 and directed somewhat as a column, through the center of lens 17, through block 9, and through block 15, since there is no optical surface in block 9 for internal reflection where block 15 is on the surface. The light 42 continues through block 25, and then through the surface of focusing or objective lens 27, from which it is focused on aperture 31 and incident on the active surface of phototransistor 29. Focusing on the aperture 31 precisely defines the region of paper 23 observed, while the phototransitor 29 responds equally well to the out-of-focus image. The scanner functions well without precise positioning of the document 23.

MANUFACTURING CONSIDERATIONS FOR FIRST EMBODIMENT

Theoretically, the entire optical system consisting of lenses 7, 17 and 27 and blocks 9, 15 and 25 could be molded as a single piece. Where the material is acrylic resin, surfaces 11 and 13, which must be optically polished to achieve total internal reflection, can be so obtained by polishing the surface of the mold.

The device has been made from two pieces, with the elements of block 9 and lenses 7 and 17 being one molded piece of acrylic resin and the elements of blocks 15 and 25 and lens 27 as a second piece. Attachment is by optically clear epoxy cement, which has an index of refraction nearly the same as that of the acyrlic resin.

Figure 2:
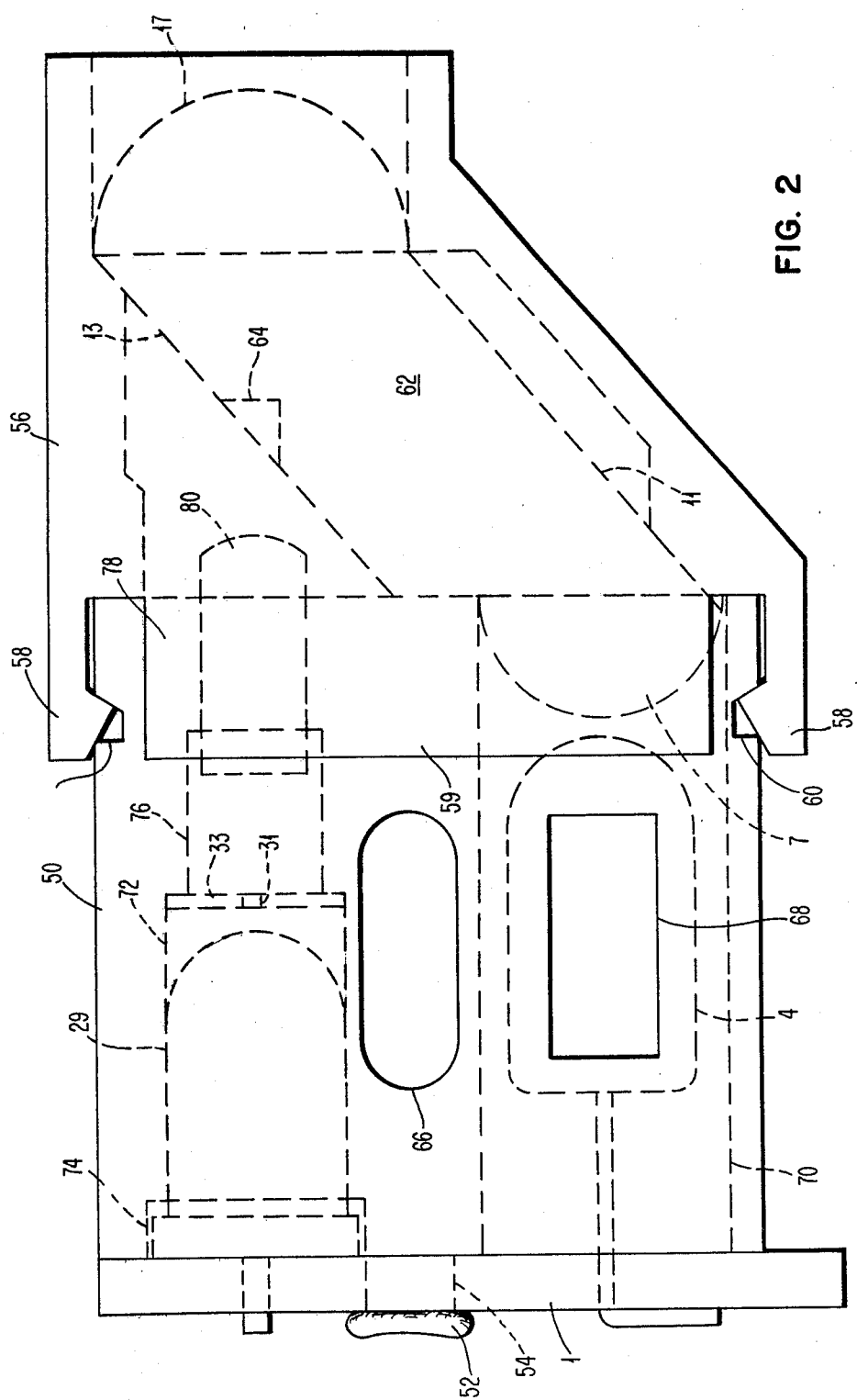
FIG. 2 is a side view of the preferred scanner assembly, in which lens elements are separate.
Figure 3:
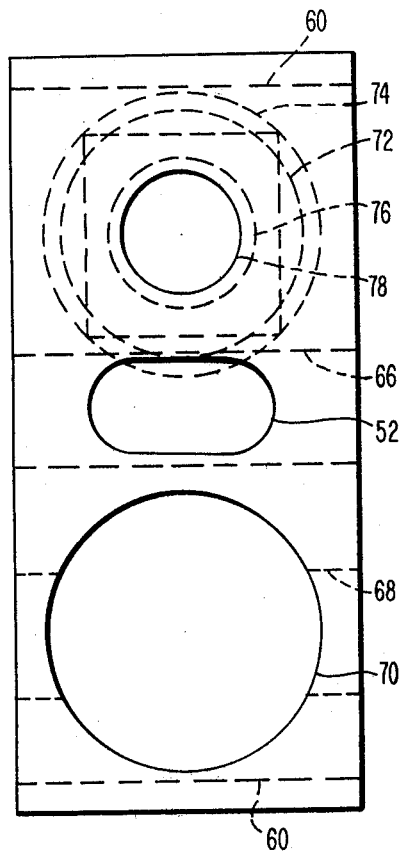
FIG. 3 is an end view of the support frame of FIG. 2.
Figure 4:
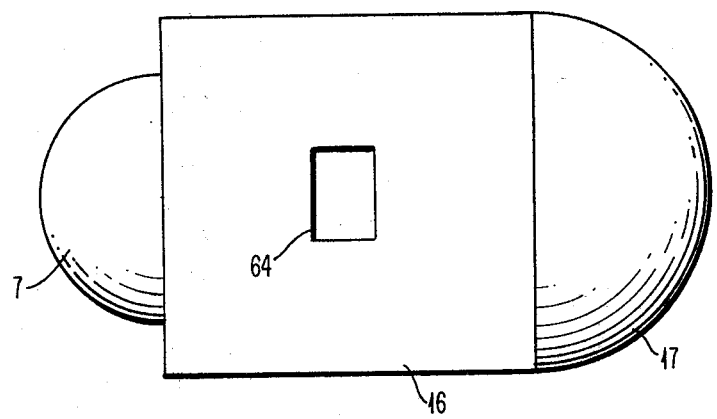
FIG. 4 is a view of the light-directing lens system of the preferred embodiment, showing the notch to negate total internal reflection at the two surfaces of the notch.

SECOND, PREFERRED EMBODIMENT

Where manufacturing of all of the lenses and optically transmitting blocks can be achieved in one molding operation, the first embodiment might be preferred. The presently preferred embodiment is shown in FIGS. 2-4, were substantially identical parts are given the same reference numerals as those in the first embodiment. This embodiment differs in certain respects from the first embodiment as is apparent or discussed below.

The assembly has a one-piece support frame 50, mounted to the rear housing wall 1 by hot upset 52. Frame 50 is rectangular in cross section as shown in FIG. 3. Hot upset 52 is an integral extension from frame 50 which initially can be passed through a hole 54 in wall 1, the outer end then being softened by heat and deformed against the side of wall 1 so as to mount frame 50 to wall 1.

A support cap 56 has yieldable arms 58 which deform around opposite sides of frame 50 and then snap into the grooves 60 near the outer end of frame 50. The wider arms 59 merely rest against the sides of frame 50. Cap 56 fits around and physically contacts and thereby holds the optical elements of lens 17 and block 62 (essentially identical to block 9 of the first embodiment except that it has a notch 64, as will be discussed).

Frame 50 has a central, oblong slot 66 extending across frame 50 and located between the phototransistor 29 and the light 4, which is to receive a mounting screw. Frame 50 has rectangular opening 68 extending across frame 50 and located at the region of the center of light 4, which is to dissipate heat from light 4. Frame 50 has a cylindrical opening 70 extending from wall 1 to the opposite side, in which is located light 4 and lens 7.

Frame 50 also has a cylindrical opening 72, extending from a somewhat wider and much shorter cylindrical opening 74, which is next to wall 1. Phototransistor 29 is located in openings 72 and 74. Opening 72 terminates somewhat past the center between wall 1 and the opposite end of frame 50 and communicates with a somewhat narrower cylindrical opening 76. Cylindrical opening 76 communicates with a still narrower cylindrical opening 78, which holds objective lens 80 (lens 80 is basically the same as objective lens 27 in the first embodiment; since light enters from air to lens, the convex curvature produces the desired focusing effect). Lens 80 is acrylic resin and is mounted in frame 50 by being in a tight or press fit in opening 78.

The light paths are as discussed in connection with the first embodiment except for specific variations where the elements differ. Thus, internal reflections at the center surface 13 is inhibited by notch 64, shown from one side in FIG. 2 and from 90° to that side in FIG. 4. Notch 64 presents a surface almost perpendicular to the path of light reflected from surface 11. Light incident at such an angle is simply transmitted out the surface. Similarly, light collected by lens 17 and directed toward lens 80 encounters the other surface of notch 64 at almost 90°. That light therefore is not reflected but exits through notch 64 and continues to lens 80.

Light received from document 23 exits block 9 through notch 64 and emerges into air. This light is generally collimated by the center of lens 17 and the collimated light is trained on the convex surface of objective lens 80. As in the first embodiment, the light is focused on aperture 31 in an opaque wall 33 positioned prior to photoconductor 29, and the light passing through aperture 31 is incident on phototransistor 29.

THE SCANNER IN OPERATION

Figure 5:
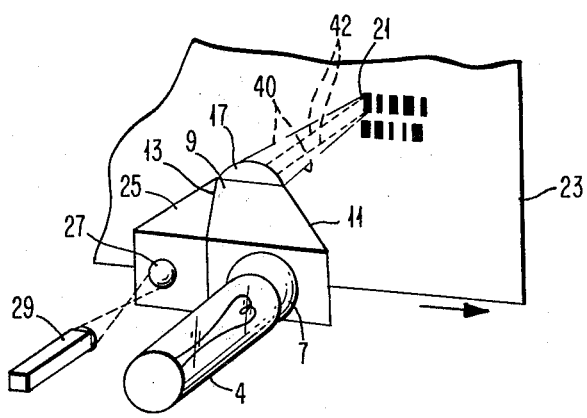
FIG. 5 is an idealized, perspective view showing the major elements without housing structure; the device is shown scanning bar code.

In FIG. 5 the scanner of the first embodiment is shown with its major parts without mounting structures so as to further illustrate the relationship of the elements and use of the scanner. A primary application for the scanner of this invention is in reading bar code from a document 23. Document 23 typically is mounted on a platen or similar roller, and held in place by a bail or the like in the manner of a conventional typewriter. Light 40 from lamp 4 is focused on region 21 through the optical structures as previously described. In the particular application illustrated in FIG. 2, the light 40 illuminates a height and width corresponding to a predetermined part of a single bar of bar code information marked on document 23.

The reflected light 42 is brought to lens 27 as described, and is focused on phototransistor 29. The entire scanner is moved relative to document 23 across the width of the bar code as shown by the arrow. Signals from phototransistor 29 are typically observed at regular intervals under the control of a system timer or clock.

As suggested in FIG. 5, the scanner is actually trained on the paper 23 at a substantial angle from the perpendicular. This is not fundamental to the invention, but is done to compress the vertical space requirements of the scanner. The large angle to the left, 30 degrees in the actual embodiment, positions the entire scanner toward the page and thereby reduces the space occupied by the scanner in the vertical direction. Since the light is training on the paper at a substantial angle, reflections as from a mirror from the flat, outer surfaces of paper 23 are minimized. This is an advantage, but transmission of mirror reflection may be minimized in systems of other configurations by straightforward design techniques.

ALTERNATIVE DESIGNS

An alternative design employs the modification of the central surface of lens 17 so that it is an outer surface of an objective lens. This facilitates design to reject mirror-type reflections and permits the entire scanner to be very slightly closer to the document 23. Manufacture of the two outer surfaces on the same element requires expensive precision. As mentioned, where mirror reflections are a problem, they can be substantially eliminated by straight-forward techniques in designing the optical system receiving the reflections. Moreover, training the scanner at an angle as small as 18 degrees from the perpendicular substantially eliminates reception of mirror reflections.

It will be clear that this invention can take various forms without departing of the spirit and scope of the contributions herein disclosed and that, accordingly, patent protection should not be limited to the specific embodiments herein disclosed, but should be in accordance with law, with particular reference to the accompanying claims.

What is claimed is:

1. An optical scanner having a light source, a first optical system for directing light from said source to a predetermined region, a photosensor, and a second optical system for collecting light reflected from markings on a surface at said region and directing said reflections on to said photosensor wherein the improvement comprises:

said first optical system comprising a collecting lens, a first reflective planar surface, and a second reflective planar surface parallel to said first planar surface, and an outer condenser lens, the center area on the axis of said condenser lens being part of said second optical system, said first optical system being adapted and arranged to collect light emitted by said light source, direct said light in a beam formed by said collecting lens, reflect said beam from said first surface to said second surface, reflect at least a part of said beam from said second surface to said condenser lens, and focus said beam by said condenser lens near said predetermined region, and said second optical system comprising an objective lens and an area within said second planar surface adapted to transmit light from said center area of said condenser lens to said photosensor.

2. The optical scanner as in claim 1 in which said planar surfaces are formed by a transparent block so that said reflections are by total internal reflection and in which said area within said second planar surface has no surface at an angle which would reflect light in said second optical system.

3. The optical scanner as in claim 1 in which said center area of said condenser lens has a curvature and optical characteristics of least generally approximating that of a collimating lens and in which an objective lens is located between said area within said second planar surface and said photosensor.

4. The optical scanner as in claim 2 in which said center area of said condenser lens has a curvature and optical characteristics of least generally approximating that of a collimating lens and in which an objective lens is located between said area within said second planar surface and said photosensor.

5. The optical scanner as in claim 4 in which said area within said second planar surface is formed by a transparent member in optical communication with said block located at said area.

6. The optical scanner as in claim 4 in which said area within said second planar surface is formed by a notch made in said block which presents a surface in said second optical system at an angle at which said collected light in said second optical system is not reflected by total internal reflection.

7. The optical scanner as in claim 1 in which said condenser lens is a single, generally hemispherical member of light transmissive material, the center area of which being said part of the second optical system.

8. The optical scanner as in claim 2 in which said condenser lens is a single, generally hermispherical member of light transmissive material, the center area of which being said part of the second optical system.

9. The optical scanner as in claim 3 in which said condenser lens is a single, generally hemispherical member of light transmissive material, the center area of which being said part of the second optical system.

10. The optical scanner as in claim 2 in which said condenser lens is a single, generally hemispherical member of light transmissive material, the center area of which being said part of the second optical system.

11. The optical scanner as in claim 5 in which said condenser lens is a single, generally hemispherical member of light transmissive material, the center area of which being said part of the second optical system.

12. The optical scanner as in claim 6 in which said condenser lens is a single, generally hemispherical member of light transmissive material, the center area of which being said part of the second optical system.

13. The optical scanner as in claim 12 in which said collecting lens, said block, and said condenser lens are a one-piece member held in relation to said light source and an objective lens in said second optical system by a mounting frame and a cap which meshes with said mounting frame, said mounting frame and cap being in contact with and physically holding said one-piece member.

* * * * *